United States Patent [19]

Tomac

[11] Patent Number: 4,958,056
[45] Date of Patent: Sep. 18, 1990

[54] ELECTRODE HOLDER

[75] Inventor: Anthony J. Tomac, Troy, Mich.

[73] Assignee: C. M. Smillie & Company, Ferndale, Mich.

[21] Appl. No.: 465,708

[22] Filed: Jan. 16, 1990

[51] Int. Cl.$^5$ .............................................. B23K 11/31
[52] U.S. Cl. ...................................................... 219/120
[58] Field of Search ................................. 219/119, 120

[56] References Cited

U.S. PATENT DOCUMENTS

| | | | |
|---|---|---|---|
| 2,980,790 | 4/1961 | Bracken | 219/120 |
| 3,215,811 | 11/1965 | Kroy et al. | 219/120 |
| 3,356,821 | 12/1967 | Width | 219/120 |
| 3,558,847 | 1/1971 | Width | 219/120 |

*Primary Examiner*—Clifford C. Shaw
*Attorney, Agent, or Firm*—Dykema Gossett

[57] ABSTRACT

An improved electrode holder is disclosed that ensures a fluid cooled electrode will have an outer shank properly positioned relative to a cooling fluid tube. The electrode holder includes a ring portion with an inner periphery having an O-ring and a plurality of jaw teeth which receive the electrode. The electrode has a conically tapered portion at one end which extends from a first diameter outwardly to a second diameter. The inner periphery of the ring portion is of a third diameter intermediate the first and second diameter of the conically tapered portion. The conically tapered portion of the electrode is received within the inner periphery of the ring portion to a certain extent. At a predetermined point the O-ring within the ring portion abuts the conically tapered portion defining a desired position for the electrode. The cooling fluid tube is positioned within a body at a fixed point and is received within the electrode. Thus, it is ensured that the electrode is properly positioned with respect to the cooling fluid tube. The jaw teeth have a cylindrical outer periphery for the majority of their axial extent so that the electrode holder may be easily mounted within most existing electrode combinations.

15 Claims, 1 Drawing Sheet

U.S. Patent  Sep. 18, 1990  4,958,056
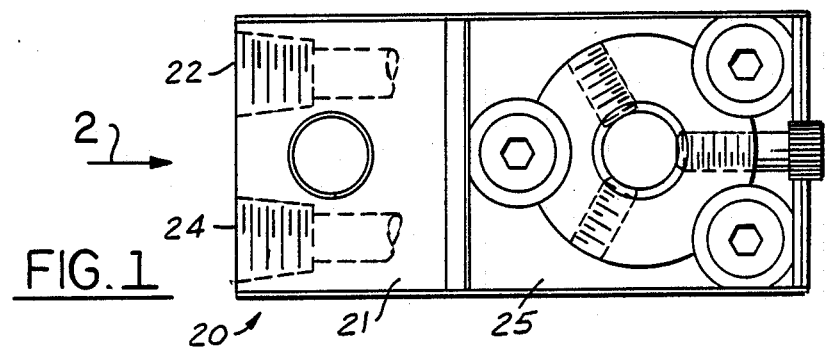
FIG. 1
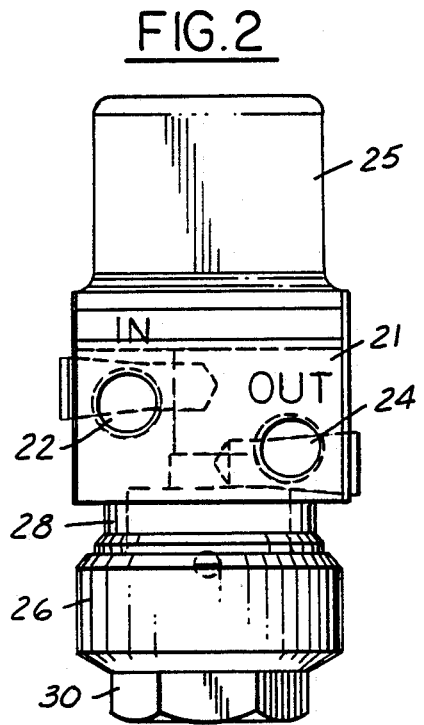
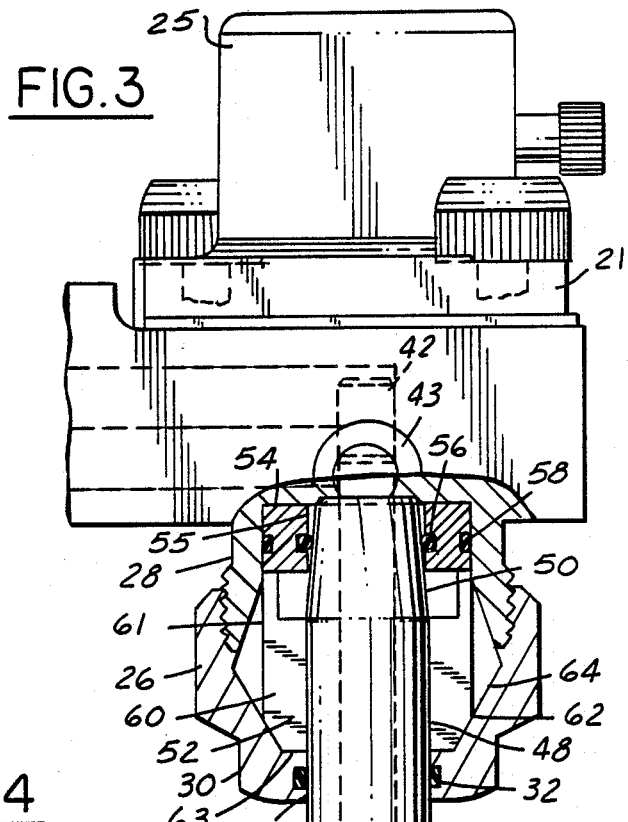
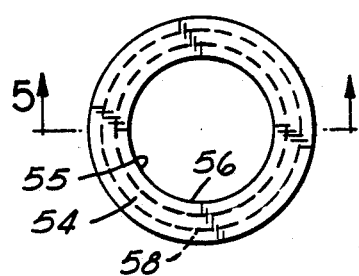
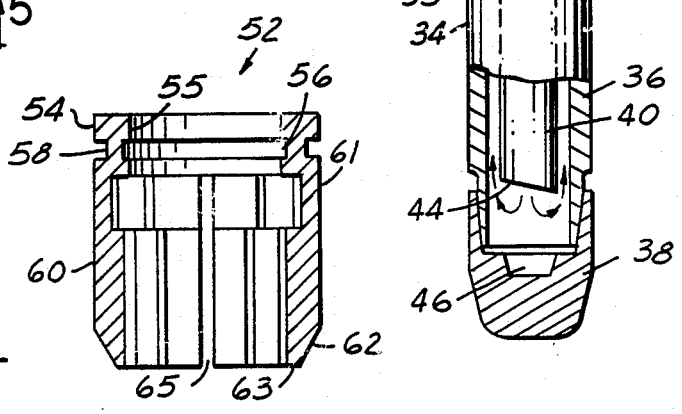

ELECTRODE HOLDER

BACKGROUND OF THE INVENTION

This invention relates to an improved electrode combination that may be quickly substituted for existing electrode combinations. More particularly, this invention relates to an improved electrode holder for use with electrodes having cooling tubes internally received therein and which provides a mean for properly positioning the cooling tubes with respect to the tip of the electrode.

Electrode holders are known in the prior art and are used in many industrial application such as spot welding. The electrodes utilized with these electrode holders are often fluid cooled by an internal cooling fluid tube.

An example of a prior art electrode holder is disclosed in U.S. Pat. No. 3,215,811 in which an electrode holder receives an electrode having an internal cooling fluid tube. The cooling fluid tube is connected into fluid passages in a body portion to which the electrode holder is attached. The cooling fluid tube extends to a position within the electrode such that a lower end is spaced above the tip of the electrode by a set distance. This distance must be accurately controlled to ensure the cooling fluid tube is not positioned too close or too far from the tip. If the cooling fluid tube is positioned too far from the tip it is possible that an inadequate supply of cooling fluid will reach the tip of the electrode. If the cooling fluid tube extends to a position too close to the electrode tip, it may restrict the return flow of fluid, which is normally about the outer periphery of the cooling fluid tube. Both situations are undesirable and thus it is preferable to be able to accurately position the cooling fluid tube within the electrode at a desired distance from the electrode tip.

The prior art electrode holders do not always allow accurate positioning of the electrode with respect to the cooling fluid tube.

It is therefore an object of the present invention to disclose an electrode combination in which the electrode will be properly positioned with respect to the cooling fluid tube such that the end of the cooling fluid tube is accurately spaced from the electrode tip to ensure optimum flow of cooling fluid.

It is further an object of the present invention to disclose such an electrode holder that may be easily incorporated into existing electrode combinations.

SUMMARY OF THE INVENTION

The present invention discloses an electrode combination that includes an electrode holder and an electrode with means to properly position the electrode relative to the holder. The electrode has a working tip at one axial end and a conical portion at the opposed axial end. The conical portion is of a first diameter at the opposed axial end and diverges radially outwardly to a second diameter greater than the first diameter.

In a disclosed embodiment of the present invention, the means to properly position the electrode includes the holder having a hollow cylindrical ring portion with an inner periphery receiving an inner O-ring in a groove and an outer periphery. The inner periphery is of a third diameter intermediate the first and second diameter of the conical portion. The conical portion is received within the ring portion such that the conical portion abuts the inner O-ring which defines a proper position for the electrode. The electrode holder is positioned on a body which includes cooling fluid passages. The cooling fluid tube, or deflector tube is connected into the body and communicates with the cooling fluid passages. Thus, by properly positioning the electrode upon the electrode holder, and thereto to the body, it can be assured that the electrode is properly positioned with respect to the cooling fluid tube.

In a preferred embodiment of the present invention, the ring portion is connected to collet jaw teeth which receive the electrode. The jaw teeth extend from the ring portion in a direction towards the tip of the electrode and define a cylindrical portion, with a cylindrical outer periphery immediately adjacent the ring portion. The collet teeth have an inwardly extending portion extending from the cylindrical portion. The collet has an inner diameter approximately equal to the second diameter while the outer periphery of the cylindrical portion of the jaw teeth is equal in diameter to the outer periphery of the ring portion.

In a most preferred embodiment of the present invention, the electrode holder is received within a clamp and boss connection, with the boss extending from the electrode body and the clamp connected to the boss upon screw threads. The electrode extends through an opening at one end of the clamp and the electrode holder is received within the boss.

The cooling fluid tube is connected to the fluid passages in the body. The electrode is positioned properly with respect to the ring portion by moving it upwardly into the ring portion until the conical portion of the electrode abuts the O-ring. The clamp is connected upon the boss and tightened on the screw threads.

As the clamp is tightened upon the boss, the collet jaw teeth are moved inwardly to securely grip the electrode. Thus, it is ensured that the electrode is firmly held by the electrode holder while at the same time properly positioned with respect to the cooling fluid tube.

The structure of the collet jaw teeth, having a cylindrical outer portion for the majority of their axial extent, ensures that the electrode holder will be easily replaceable into existing electrode combinations. In the prior art electrode holders, there was often a first outwardly radially diverging portion and then a second radially inwardly diverging portion. It was often difficult to properly align these portions with respect to a boss and clamp member. The present invention is an improvement over these types of electrode holders.

These and other objects and features of the present invention can be best understood from the following specification and drawings of which the following is a brief description.

BRIEF DESCRIPTION OF THE DRAWINGS

FIG. 1 is a top view of an electrode combination.

FIG. 2 is a front view looking in the direction of the arrow 2 in FIG. 1.

FIG. 3 is a partial cross-sectional view through the electrode holder illustrated in FIG. 1.

FIG. 4 is a cross-sectional view through the collet member of the present invention.

FIG. 5 is a cross-sectional view along lines 5—5 as illustrated in FIG. 4.

DETAILED DESCRIPTION OF A DISCLOSED EMBODIMENT

Electrode combination 20 is illustrated in FIG. 1 and includes body 21 with cooling fluid inlet 22 and cooling fluid outlet 24. Upper housing member 25 may be connected to an electric cable power supply for the electrode.

Body 21 is illustrated in FIG. 2 with inlet 22 and outlet 24 extending from a front face. Upper body 25 is above fluid inlet 22 and outlet 24. Boss 28 extends downwardly from body 21 and clamp 26 has a wrench flat portion 30 at a vertically lowermost extent.

As illustrated in FIG. 3, clamp 26 receives O-ring 32 to tightly seal electrode 34, which extends through opening 35 in clamp 26. Electrode 34 has shank 36 defining an outer periphery and extending to tip 38 at one axial end of electrode 34. A cooling fluid tube 40, or deflector tube, supplies cooling fluid through shank 36 to tip 38. Cooling fluid tube 40 is connected 42 to inlet 22 and is connected 43 to outlet 24.

Cooling fluid tube bottom 44 is positioned a set distance above an electrode tip inner surface 46. It is an object of the present invention to optimize this distance by properly positioning the shank 36 with respect to cooling fluid tube 40.

Shank 36 has a first cylindrical outer periphery portion 48 extending from tip 38 to a conically inwardly tapered portion 50. Conically inwardly tapered portion 50 has a first diameter at the end of electrode 34 removed from tip 38. Conically inwardly tapered portion 50 has a second diameter at the point where it merges into cylindrical outer portion 48. The second diameter is of a greater diameter than the first diameter. An electrode holder, or collet 52 has ring portion 54 with inner periphery 55 having O-ring groove 56 receiving an O-ring. An outer periphery of ring portion 54 also has an O-ring groove 58 that receives an O-ring. Electrode holder 52 has a series of jaw teeth 60 extending away from ring portion 54 in a direction towards tip 38.

Each jaw tooth 60 includes cylindrical portion 61 extending away from ring portion 54 and conically inwardly tapered portion 62 defining end 63 of electrode holder 52. Cylindrical outer portion 61 is of the same diameter as the outer periphery of ring portion 54. The conically inwardly tapered portion 63 of electrode holder 52 corresponds to a conically tapered portion 64 in clamp 26.

Electrode holder 52 is illustrated in FIG. 4 with ring portion 54 having O-ring grooves 56 and 58. The inner periphery 55 of ring portion 54 is of a third diameter, intermediate the first and second diameters defined by the conically inwardly tapered portion 50 of electrode 34.

FIG. 5 is a cross-sectional view along lines 5—5 in FIG. 4 and illustrates electrode holder 52 having ring portion 54 with inner periphery 55 having O-ring groove 56 and an outer periphery having O-ring groove 58. Cylindrical outer portion 61 extends from ring portion 54 and merges into conically inwardly tapered portion 62 which defines end 63. Gaps 65 space each jaw tooth 60.

The advantages of the present invention will now be explained with reference to the drawings. When electrode 34 is to be mounted to body 21, cooling fluid tube 40 is first connected through 42 and 43 to inlet 22 and outlet 24. Since cooling fluid tube 40 will be in a fixed position with respect to body 21, it remains to properly position shank 36 with respect to body 21 in order to insure that the bottom 44 of the cooling fluid tube 40 is properly spaced above tip inner surface 46. Electric holder 52 is positioned within boss 28 and clamp 26 is mounted upon boss 28 with electrode 34 extending through opening 35. Electrode 34 is moved vertically upwardly into the inner periphery 55 of ring portion 54 until O-ring 56 provides resistance to further movement. The relative diameters of ring portion 54 and conically inwardly tapered portion 62 are selected to control the position at which this resistance occurs. This gives an indication that shank 36 is properly positioned with respect to electrode holder 54 and thereto to electrode body 21. Clamp 26 is tightened upon boss 28 through wrench flats 30 and conical portion 64 of clamp 26 forces the conically inwardly tapered portion 62 of jaw teeth 60 radially inwardly to firmly grasp electrode 34.

Since electrode holder 52 has jaw teeth 60 with a cylindrical outer portion 61 rather than a outwardly diverging portion and then a inwardly diverging portion as is often the case in the prior art, electrode holder 52 may be easily utilized into existing electrode combination. The configuration of electrode holder 52 provides some flexibility to accommodate misalignment of electrode holder 52 with respect to boss 28 and clamp 26.

A preferred embodiment of the present invention has been disclosed, however, a worker in the art would realize that certain modification would be obvious to one of ordinary skill in the art and thus the following claims should be studied in order to determine the true scope and content of the present invention.

What is claimed:

1. An electrode combination comprising:
   an electrode holder;
   an electrode;
   means to properly position said electrode relative to said holder;
   said electrode having a tip at one axial end and a conical portion at the opposed axial end, said conical portion being of a first diameter at said opposed axial end and diverging outwardly to a second diameter, said second diameter being greater than said first diameter;
   said means to properly position including said electrode holder having a cylindrical ring portion with an inner periphery and an outer periphery, said inner periphery receiving an inner O-ring in a groove, said inner periphery of said ring portion being of a third diameter, said third diameter being intermediate said first and second diameters;
   said ring portion receiving said conical portion until said conical portion abuts said inner O-ring to properly position said electrode relative to said holder.

2. An electrode combination as recited in claim 1, wherein the ring portion of said electrode holder is provided with a series of jaw teeth.

3. An electrode combination as recited in claim 2, wherein said jaw teeth extend from said ring portion in a direction towards said one axial end of said electrode.

4. An electrode combination as recited in claim 3, wherein said jaw teeth defining a cylindrical outer portion adjacent said ring portion.

5. An electrode combination as recited in claim 4, wherein said jaw teeth having a conically inwardly extending portion tapered from said cylindrical outer portion.

6. An electrode combination as recited in claim 5, wherein said cylindrical outer portion being hollow and having an inner periphery of said second diameter.

7. An electrode combination as recited in claim 6, wherein said outer periphery of said ring portion being equal to said outer periphery of said cylindrical outer portion of said jaw teeth.

8. An electrode combination as recited in claim 7, wherein said electrode holder being received within a boss, a clamp being received over said boss, said electrode extending through an opening in said clamp, said clamp being tightened on said boss to squeeze said jaw teeth inwardly to grip said electrode.

9. An electrode combination as recited in claim 8, wherein said electrode having a hollow shank extending from said tip, a cooling fluid tube being received within said hollow shank, said cooling fluid tube being connected to a cooling fluid supply.

10. An electrode combination as recited in claim 9, wherein said shank is positioned within said ring portion such that said conical portion is moved upwardly into said inner periphery of said ring portion until said conical portion abuts said O-ring, thus properly positioning said shank with respect to said cooling fluid tube.

11. An electrode assembly as recited in claim 10, and further wherein said cooling fluid tube having a bottom positioned a distance above an inner surface of said tip, said means to properly position said electrode optimizing said distance.

12. A method of properly positioning an electrode including the steps of:
(A) providing an electrode with a first cylindrical portion merging into a conically inwardly tapered portion at an end opposed to the electrode tip, the end opposed to the electrode tip being of a first diameter and extending outwardly to merge into the cylindrical portion, the cylindrical portion being of a second diameter;
(B) providing an electrode holder having a ring portion with an inner periphery of a third diameter and an O-ring groove in the inner periphery of the ring portion and receiving an O-ring, the third diameter being intermediate the first and second diameter such that the electrode may be moved upwardly into said ring portion until the conically inwardly tapered portion abuts the O-ring to define a desired position for the electrode.

13. The method as recited in claim 12, wherein the electrode is of the type having a cooling fluid tube mounted within a body, the electrode being received about the cooling fluid tube, and the electrode being properly positioned within the electrode holder such that the proper positioning of the electrode with respect to the electrode holder ensures that the electrode is properly positioned with respect to the cooling fluid tube.

14. The method as recited in claim 13, wherein the electrode and electrode holder are utilized as replacement parts in existing electrode combinations.

15. An electrode combination comprising:
an electrode holder;
an electrode; having a tip at one axial end and a conical portion at the opposed axial end, said conical portion being of a first diameter at said opposed axial end and diverging outwardly to a second diameter, said second diameter being greater than said first diameter;
said electrode holder having a cylindrical ring portion with an inner periphery of a third diameter and an outer periphery, said third diameter being intermediate said first and second diameters, and O-ring groove provided in said inner periphery of the cylindrical ring portion and receiving an O-ring; and
said ring portion receiving said conical portion until said conical portion abuts said O-ring to properly position said electrode relative to said holder.

* * * * *